W. B. EVANS.
Shovel Plow.
No. 83,481.
Patented Oct. 27, 1868.
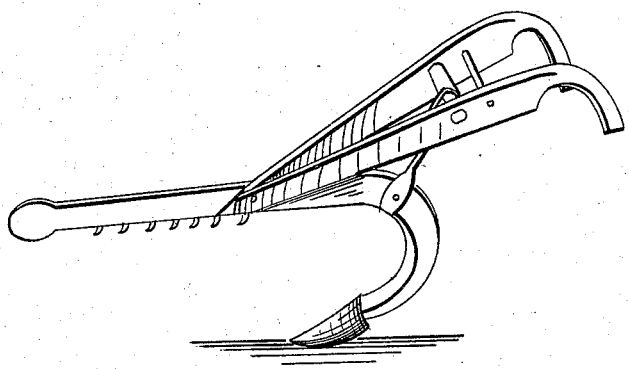

UNITED STATES PATENT OFFICE.

WILLIAM B. EVANS, OF BRACKEN COUNTY, KENTUCKY.

IMPROVEMENT IN SHOVEL-PLOWS.

Specification forming part of Letters Patent No. 83,481, dated October 28, 1867.

*To all whom it may concern:*

Be it known that I, WILLIAM B. EVANS, of the county of Bracken and State of Kentucky, have invented a new and useful Improvement on the Shovel-Plow; and I do hereby declare that the following is a full, clear, and exact description of the construction and operation of the same.

The stock is of iron and steel, except the handles, which are of wood. The beam is straightforward, but turned into a complete circle on the end to which the plow is attached by a bolt. The inner side of said circle is made of steel and made sharp. The advantages claimed are that it will not choke in any ground; will run more steadily than other shovel-plows; does not open so large a furrow; allows of plowing very near the plant without danger of covering it up, as the dust falls behind the shovel into the furrow instead of being pressed laterally, as in the common plow.

What I claim as my invention is—

The circular conformation of the rear portion of the beam, the front or inner part of which is formed of steel and reduced to a sharp cutting-edge, and bent downward at its lower end for the reception of the plowshare.

WILLIAM B. EVANS.

Witnesses:
    H. G. TABB,
    G. W. BENNETT.